United States Patent
Hong et al.

(10) Patent No.: US 10,230,106 B2
(45) Date of Patent: Mar. 12, 2019

(54) CATHODE ACTIVE MATERIAL HAVING EXCELLENT ELECTROCHEMICAL PROPERTIES AND LITHIUM SECONDARY BATTERY COMPRISING THE SAME

(71) Applicant: LG Chem, Ltd., Seoul (KR)

(72) Inventors: Ki Joo Hong, Seoul (KR); Hyeon Hui Baek, Seoul (KR); Dong Kyu Yun, Seongnam-si (KR); Chang Joo Han, Seoul (KR)

(73) Assignee: LG Chem, Ltd. (KR)

( * ) Notice: Subject to any disclaimer, the term of this patent is extended or adjusted under 35 U.S.C. 154(b) by 91 days.

(21) Appl. No.: 15/152,105

(22) Filed: May 11, 2016

(65) Prior Publication Data
US 2017/0222223 A1  Aug. 3, 2017

(30) Foreign Application Priority Data
Jan. 28, 2016  (KR) .................. 10-2016-0010755

(51) Int. Cl.
*H01M 4/525* (2010.01)
*H01M 4/505* (2010.01)
(Continued)

(52) U.S. Cl.
CPC ......... *H01M 4/525* (2013.01); *H01M 4/0471* (2013.01); *H01M 4/131* (2013.01);
(Continued)

(58) Field of Classification Search
CPC .. H01M 4/366; H01M 10/0525; H01M 4/525; H01M 2004/028; H01M 2004/021;
(Continued)

(56) References Cited

U.S. PATENT DOCUMENTS

| | | | |
|---|---|---|---|
| 2010/0143791 A1* | 6/2010 | Park ................. | C01G 23/005 429/164 |
| 2012/0074351 A1* | 3/2012 | Levasseur .......... | H01M 4/1391 252/182.1 |

(Continued)

FOREIGN PATENT DOCUMENTS

| KR | 20150047053 A | 5/2015 |
|---|---|---|
| KR | 20150106203 A | 9/2015 |

OTHER PUBLICATIONS

Hashimoto, Satoshi and Tanaka, Akihiro, "Alteration of Ti 2p XPS spectrum for titanium oxide by low-energy Ar ion bombardment," Surface and Interface Analysis, pp. 262-265, vol. 34, (Dec. 24, 2001accepted) published online in Wiley InterScience (www.interscience.wiley.com), DOI: 10.1002/sia.1296.

*Primary Examiner* — Jonathan G Jelsma
*Assistant Examiner* — Omar M Kekia
(74) *Attorney, Agent, or Firm* — Lerner, David, Littenberg, Krumholz & Mentlik, LLP

(57) ABSTRACT

The present disclosure provides a cathode active material comprising: lithium transition metal oxide-based particles; and a titanium dioxide coating layer formed on a part or a whole of a surface of the particle, in which the titanium dioxide coating layer is a partially reduced $TiO_{2-x}$ (0<x<2), a preparation method thereof, and a lithium secondary battery including the cathode active material. The cathode active material of the present disclosure may significantly improve electrochemical properties of an electrochemical device including the cathode active material, preferably a lithium secondary battery by decomposing lithium-containing impurities remaining on the surface of the cathode active material by a partially reduced titanium dioxide coating (Continued)

layer formed on the surface of the cathode active material and enhancing the electrical conductivity of the cathode active material.

17 Claims, 7 Drawing Sheets

(51) Int. Cl.
    *H01M 4/04*     (2006.01)
    *H01M 4/131*     (2010.01)
    *H01M 4/1391*     (2010.01)
    *H01M 4/36*     (2006.01)
    *H01M 4/62*     (2006.01)
    *H01M 10/0525*     (2010.01)
    *H01M 4/02*     (2006.01)

(52) U.S. Cl.
    CPC ......... *H01M 4/1391* (2013.01); *H01M 4/366* (2013.01); *H01M 4/505* (2013.01); *H01M 4/62* (2013.01); *H01M 10/0525* (2013.01); *H01M 2004/021* (2013.01); *H01M 2300/004* (2013.01)

(58) Field of Classification Search
    CPC .... H01M 4/505; H01M 4/0471; H01M 4/131; H01M 4/1391; H01M 4/62; H01M 2300/004
    USPC .......................................................... 429/105
    See application file for complete search history.

(56) References Cited

U.S. PATENT DOCUMENTS

2014/0057163 A1*   2/2014   Bae ........................ H01M 4/485
    429/211
2015/0099177 A1*   4/2015   Goto ..................... H01M 4/485
    429/221

* cited by examiner

CATHODE ACTIVE MATERIAL HAVING EXCELLENT ELECTROCHEMICAL PROPERTIES AND LITHIUM SECONDARY BATTERY COMPRISING THE SAME

CROSS-REFERENCE TO RELATED APPLICATIONS

This application claims benefit and priority to Korean Patent Application No. 10-2016-0010755, filed on Jan. 28, 2016, with the Korean Intellectual Property Office, the disclosure of which is incorporated herein in its entirety by reference.

TECHNICAL FIELD

The present disclosure relates to a novel cathode active material which may significantly improve electrochemical properties of a lithium secondary battery by modifying a surface of a cathode active material with partially reduced titanium dioxide to decompose lithium-containing impurities remaining on the surface of the cathode material and enhance the electrical conductivity thereof, a preparation method thereof, and an electrochemical device including the cathode active material, preferably a lithium secondary battery.

BACKGROUND

Recently, as electronic devices have become smaller, there is a need for a high-capacity secondary battery, and particularly, lithium secondary batteries having higher energy densities than nickel cadmium batteries and nickel hydrogen batteries have drawn attention.

As a cathode active material of the lithium secondary battery, a lithium-containing cobalt oxide ($LiCoO_2$) has been mainly used, and in addition to the material, the use of lithium-containing manganese oxides such as $LiMnO_2$ having a layered crystal structure and $LiMn_2O_4$ having a spinel crystal structure and a lithium-containing nickel oxide $LiNiO_2$ has also been considered. Among the cathode active materials, $LiCoO_2$ has been most widely used due to excellent life characteristics and charge and discharge efficiency, but has limitations in cost competitiveness to be used in a large amount as a power source in the medium and large battery field such as electric vehicles because $LiCoO_2$ has a small capacity and is expensive due to resource limitations of cobalt used as a raw material. Lithium manganese oxides such as $LiMnO_2$ and $LiMn_2O_4$ have advantages in that the manganese resources used as a raw material are abundant and thus inexpensive, environmentally friendly, and excellent in thermal stability, but have problems in that the capacity is low, and high temperature characteristics and cycle characteristics, and the like are poor.

In order to supplement these disadvantages, the demand for the Ni rich system as a cathode active material of a secondary battery began to increase. The active material of the Ni rich system has an excellent advantage in that high capacity is exhibited, while there occurs a deterioration phenomenon of the battery performance due to a side reaction with an electrolyte solution and lithium-containing impurities remaining on a surface of a cathode material. In particular, with respect to the cathode active material with a layered structure, which has a high capacity, due to irreversible reactions occurring from a high content of the remaining lithium, the coulomb efficiency becomes low, a decrease in cycle life occurs, and an aspect that the above-described deterioration in performance of the battery becomes worse as the potential becomes high is shown.

A technology for suppressing the above-described lithium-containing impurities has been currently developed, but a satisfactory result has not yet been elicited. Therefore, there is a desperate need for developing a cathode active material having a novel configuration, which may enhance the electrochemical properties and reliability of a lithium secondary battery for a long period of time.

SUMMARY

The present disclosure has been made in an effort to provide a cathode active material which has high electrical conductivity and not only is stable at high potential, but also has high coulomb efficiency and battery capacity by modifying a surface of a cathode material with titanium dioxide and introducing titanium dioxide partially reduced through heat treatment into the surface instead of introducing titanium dioxide similar to an insulator in the related art into the surface, and a preparation method thereof.

The present disclosure has also been made in an effort to provide a lithium secondary battery which includes the above-described cathode active material, and thus has excellent cycle life characteristics and high battery capacity even at high voltage. An exemplary embodiment of the present disclosure provides a cathode active material including: lithium transition metal oxide-based particles; and a titanium dioxide coating layer formed on a part or a whole of a surface of the particle, in which the titanium dioxide coating layer is a partially reduced $TiO_{2-x}$ ($0<x<2$), preferably a cathode active material for a lithium secondary battery.

In the present disclosure, the titanium dioxide coating layer may have a peak present in a range of 452 to 457 eV in the Ti2p spectra by an X-ray photoelectron spectrometry (XPS).

In the present disclosure, the titanium dioxide coating layer may have a ratio ($P_S/P_R$) of peak intensity ($P_S$) of 452 to 457 eV derived from partially reduced Ti to peak intensity ($P_R$) of 457 to 460 eV derived from $Ti^{4+}$ in a range of 0.01 to 0.5 in the Ti2p spectra by an X-ray photoelectron spectrometry (XPS).

In the present disclosure, the cathode active material may have a ratio ($R_{TiO2-x}/R_{TiO2}$) of powder resistivity ($R_{TiO2-x}$) of partially reduced titanium dioxide to powder resistivity ($R_{TiO2}$) of titanium dioxide of 0.5 or less under compression conditions of 13 to 64 MPa.

In the present disclosure, the cathode active material may include Li-containing impurities remaining on the surface thereof, in which the content of the Li-containing impurities may be 2.0 wt % or less based on the total weight of the cathode active material, and the weight ratio ($Li_2CO_3/LiOH$) of $Li_2CO_3$ and LiOH contained as the Li-containing impurities may be in a range of 1.0 to 5.0, preferably in a range of 1.0 to 3.0.

In the present disclosure, the average particle size of the partially reduced titanium dioxide particles in the coating layer may be in a range of 0.5 to 100 nm.

In the present invention, the content of the titanium dioxide coating layer may be in a range of 0.05 to 2.0 wt % based on the total wt % of the cathode active material.

In the present invention, the lithium transition metal oxide-based particles may be selected from the group consisting of $LiCoO_2$, $LiNiO_2$, $LiMn_2O_4$, $Li_4Mn_5O_{12}$, $LiNi_{1/3}Mn_{1/3}Co_{1/3}O_2$, $LiFePO_4$, $Li(Co_xNi_{1-x})O_2$ ($0.5 \le x < 1$), $Li_aNi_bCo_cX_dO_2$ (X is one or more selected from the group consisting of Mn, Al, Mg, Ti, Zr, Fe, V, W, Si, and Sn, and $0.9 \le a \le 1.10$, $0.6 \le b \le 1.0$, $0.0 \le c \le 0.2$, and $0.0 \le d \le 0.2$), and $Li_{1+x}Mn_{2-y-z-w}Al_yCo_zMg_wO_4$ ($0.03 < x < 0.25$, $0.01 < y < 0.2$, $0.01 < z < 0.2$, $0 \le w < 0.1$, and $x+y+z+w < 0.4$).

In the present disclosure, the lithium transition metal oxide-based particles may have a nickel (Ni) content of 50% or more in the total transition metals.

Another exemplary embodiment of the present disclosure provides a cathode including the above-described cathode active material and an electrochemical device including the same, preferably a lithium secondary battery.

Yet another exemplary embodiment of the present disclosure provides a method for preparing the above-described cathode active material, the method including: (i) coating a surface of a lithium transition metal oxide-based particle with titanium dioxide; and (ii) subjecting the coated lithium metal composite oxide-based particles to heat treatment under an atmospheric condition of 550° C. or less for 0.5 to 5 hours.

In Step (i), the amount of titanium dioxide used may be 0.05 to 2.0 wt % based on the total wt % of the lithium transition metal oxide-based particles.

In the present disclosure, impurities present on the surface of the cathode material in the related art may be decomposed and the electrical conductivity may be enhanced by modifying the surface of the cathode active material using partially reduced titanium dioxide, thereby significantly improving the electrochemical properties and long-term reliability of a lithium secondary battery.

Therefore, the long-term reliability, the excellent electrochemical characteristics, and the high capacity may be simultaneously secured by applying the present disclosure to not only the existing cathode active material, but also an Ni rich system exhibiting a deterioration phenomenon of the battery performance due to irreversible reactions occurring from a high content of the remaining lithium.

The foregoing summary is illustrative only and is not intended to be in any way limiting. In addition to the illustrative aspects, embodiments, and features described above, further aspects, embodiments, and features will become apparent by reference to the drawings and the following detailed description.

EXPLANATION OF REFERENCE NUMERALS AND SYMBOLS

1: partially reduced titanium dioxide particles

DETAILED DESCRIPTION

Figure 1:
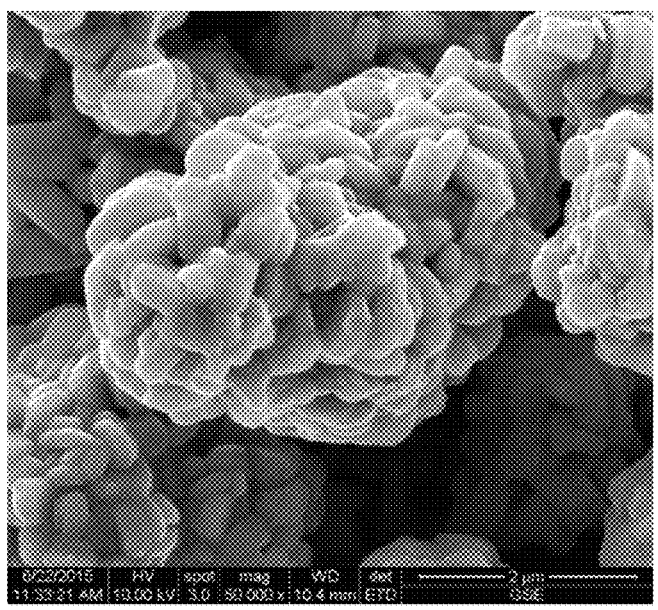
FIG. 1 is an SEM photograph of the surfaces of cathode active material prepared in Comparative Example 1.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, the present disclosure will be described in detail.

The present disclosure is characterized in that a partially reduced titanium dioxide coating layer is formed on a surface of a lithium transition metal oxide in order to significantly enhance the electrochemical properties and long-term reliability of a lithium secondary battery by protecting a surface of a cathode active material, and simultaneously, removing impurities remaining on the surface of the cathode active material.

In the related art, the titanium dioxide ($TiO_2$) is in the form of a metal oxide, and thus exhibits insulator characteristics. Accordingly, when titanium dioxide is introduced as the coating material of the cathode active material, additional effects other than a reduction in side reaction of a cathode active material with an electrolyte solution fail to be exhibited, and a decrease in electrical conductivity and a deterioration in electrochemical properties of the battery are rather incurred by insulator characteristics.

In contrast, in the present disclosure, titanium dioxide is uniformly coated on the surface of cathode active material particles, and then heat treatment is performed under the specific conditions. Through the heat treatment, an oxidation-reduction reaction between titanium dioxide and the cathode active material is induced, so that the surface of the cathode material is modified.

More specifically, in the present disclosure, by decomposing lithium carbonate present as an impurity on the surface of the cathode material through an oxidation reaction of lithium transition metal composite oxide which is a cathode active material, the coulomb efficiency may be increased, the battery capacity may be increased, and the cycle life characteristics of the battery may be enhanced.

Titanium dioxide itself is partially reduced through the reduction reaction, and thus is present in the form of $TiO_{2-x}$ on the surface of the cathode material. Accordingly, the effect of significantly enhancing the electrical conductivity of the cathode active material is exhibited.

Since the partially reduced titanium dioxide forms a protective layer of the surface of the cathode active material in the present disclosure, stable electrochemical characteristics may be exhibited even at high potential.

<Cathode Active Material>

The cathode active material according to the present disclosure includes cathode active material particles capable of intercalating and deintercalating lithium and a partially reduced titanium dioxide modified layer formed on the surface of the particle.

More specifically, the cathode active material includes: (a) lithium transition metal oxide-based particles; and (b) a titanium dioxide coating layer represented by the following Chemical Formula 1 and formed on a part or a whole of the surface of the particle.

$$TiO_{2-x}(0<x<2) \quad \text{[Chemical Formula 1]}$$

In the present invention, the partially reduced titanium dioxide coating layer may be formed by mixing lithium transition metal oxide-based particles with titanium dioxide, and then performing heat treatment in a specific temperature range.

The titanium dioxide may use a typical titanium dioxide known in the art without limitation, and may be, for example, an anatase, rutile, or brookite phase. Accordingly, in the present disclosure, titanium dioxide partially reduced through heat treatment may also be the anatase, rutile, or brookite phase.

The cathode active material according to the present disclosure exhibits a specific peak in the Ti2p spectra by an X-ray photoelectron spectrometry (XPS), indicating that a partially reduced titanium dioxide, for example, $Ti^{2+}$, $Ti^{3+}$, and the like are included in the cathode active material.

More specifically, the titanium dioxide coating layer of the present disclosure has a specific peak present in a range of 452 to 457 eV in the Ti2p spectra by an X-ray photoelectron spectrometry (XPS). Here, the peak in a range of 452 to 457 eV indicates whether a partially reduced titanium dioxide, that is, $Ti^{2+}$ or $Ti^{3+}$ is present.

In the present disclosure, the titanium dioxide coating layer may have a ratio $(P_S/P_R)$ of peak intensity $(P_S)$ of 452 to 457 eV derived from partially reduced Ti to peak intensity $(P_R)$ of 457 to 460 eV derived from $Ti^{4+}$ in a range of 0.01 to 0.5, preferably in a range of 0.18 to 0.35 in the Ti2p spectra by an X-ray photoelectron spectrometry (XPS). Here, a higher strength ratio $(P_S/P_R)$ of the XPS peak means that the content of the partially reduced titanium dioxide in the cathode active material is high.

In this case, when the strength ratio $(P_S/P_R)$ of the XPS peak of the cathode active material satisfies the above-described range, the cathode active material including the same may exhibit effects of reducing the lithium-containing impurities and enhancing electrical conductivity, and a lithium secondary battery including the same may implement long cycle life characteristics, high capacity, and excellent stability.

In the present disclosure, as the surface of the cathode active material is modified with the above-described partially reduced titanium dioxide, effects of enhancing electrical conductivity and reducing impurities of a cathode active material may be simultaneously exhibited.

That is, a lithium compound, which fails to form an oxide with a transition metal and remains, for example, lithium oxide ($Li_2O$), lithium hydroxide (LiOH), lithium carbonate ($Li_2CO_3$), lithium carbide ($Li_2C$), and the like are present on the surface of the lithium transition metal oxide-based cathode active material in the related art. The remaining lithium compound may be reacted with a specific material in an electrolyte in a secondary battery, and the reactant may be accumulated on the surface of the cathode active material, thereby interrupting the movement of lithium ions. As an example, the remaining lithium compound may be reacted with HF and the like in the electrolyte to produce LiF, thereby incurring a deterioration in performance of the battery.

In contrast, the titanium dioxide coating layer formed on the cathode active material according to the present disclosure induces an oxidation-reduction reaction between titanium dioxide and the cathode active material through heat treatment to decompose impurities present on the surface of the cathode active material, for example, lithium carbonate through oxidation, and the titanium dioxide itself is reduced from the form of $Ti^{4+}$ to the form of $Ti^{2+}$ or $Ti^{3+}$. Accordingly, not only the electrical conductivity of the cathode active material may be enhanced, but also it is possible to reduce the amount of lithium compounds which may remain on the surface of the cathode active material to cause a deterioration in performance of the battery, and simultaneously, to exhibit the effect of suppressing the degradation of the surface caused by reactions with the electrolyte.

According to an exemplary embodiment of the present disclosure, the cathode active material may have a powder resistivity value of 6,000 Ωcm or less, preferably 5,700 Ωcm or less, under a compression condition of 13 MPa.

According to another exemplary embodiment of the present disclosure, the cathode active material includes Li-containing impurities remaining on the surface thereof, in which the content of the Li-containing impurities may be 2.0 wt % or less based on the total weight of the cathode active material, and the weight ratio ($Li_2CO_3$/LiOH) of $Li_2CO_3$ and LiOH contained as the Li-containing impurities may be in a range of 1.0 to 5.0. The weight ratio may be preferably in a range of 1.0 to 3.0, and more preferably in a range of 1.0 to 2.5.

Meanwhile, it is known in the battery field that among the impurities present on the surface of the cathode material, lithium carbonate greatly affects a deterioration in electrochemical properties of the battery compared to lithium hydroxide. The lithium carbonate generates gases in the battery, thereby incurring the deterioration in cycle life of the battery and safety problems due to the swelling of the battery.

In contrast, the cathode active material into which the partially reduced titanium dioxide coating layer according to the present disclosure is introduced may selectively and remarkably reduce the amount of lithium carbonate among the impurities present on the surface in the related art, thereby significantly improving the safety and performance of the battery.

According to still another exemplary embodiment of the present disclosure, the cathode active material includes Li-containing impurities remaining on the surface thereof, in which the content of the Li-containing impurities may be 2.0 wt % or less based on the total weight of the cathode active material, and the weight ratio ($LiCO_3$/LiOH) of $LiCO_3$ and LiOH contained as the Li-containing impurities may be in a range of 1.0 to 5.0. The weight ratio may be preferably in a range of 1.0 to 3.0, and more preferably in a range of 1.0 to 2.5.

In the present disclosure, the average particle size of the partially reduced titanium dioxide particles in the coating layer is not particularly limited, and may be, for example, a size of several nanometers to several hundred nanometers. Preferably, the average particle size may be in a range of 0.5 to 100 nm, preferably in a range of 5 to 90 nm, and more preferably in a range of 5 to 50 nm.

The cathode active material according to the present disclosure may have a structure in which titanium dioxide particles having a nano size are uniformly distributed on a part of the surface of the lithium transition metal oxide, or a core-shell structure including: a core portion including a lithium transition metal oxide; and a shell portion formed by coating the surface of the core portion with titanium dioxide.

In the present disclosure, the thickness of the partially reduced titanium dioxide coating layer may be adjusted within a typical range known in the art, and may be, for example, in a range of 5 to 100 nm.

The content of the partially reduced titanium dioxide coating layer is not particularly limited, but may be, for example, in a range of 0.05 to 2.0 parts by weight based on the total weight of the cathode active material, preferably in a range of 0.08 to 1.33 parts by weight.

In the present disclosure, an object, on which the partially reduced titanium dioxide coating layer is to be formed, is a cathode active material for a lithium secondary battery.

As the cathode active material, it is possible to use a typical cathode active material which may be used for a cathode of a lithium secondary battery in the related art, for example, a lithium-containing metal oxide including an alkali metal, an alkaline earth metal, an element of Group XIII, an element of Group XIV, an element of Group XV, a transition metal, a rare earth element, or a combination of these elements. Furthermore, a chalcogenide-series compound may also be applied. Non-limiting examples thereof include lithium transition metal oxides such as $LiM_xO_y$, (M=Co, Ni, Mn, and $Co_aNi_bMn_c$) (for example, lithium manganese composite oxides such as $LiMn_2O_4$, lithium nickel oxides such as $LiNiO_2$, lithium cobalt oxides such as $LiCoO_2$, compounds in which a portion of manganese, nickel and cobalt of these oxides is substituted with other typical transition metals, and the like, or vanadium oxides containing lithium, and the like), or chalcogenide compounds (for example, manganese dioxide, titanium disulfide, molybdenum disulfide, and the like), and the like.

More specifically, the lithium transition metal oxide-based compound may be selected from the group consisting of $LiCoO_2$, $LiNiO_2$, $LiMn_2O_4$, $Li_4Mn_5O_{12}$, $LiNi_{1/3}Mn_{1/3}Co_{1/3}O_2$, $LiFePO_4$, $Li(Co_xNi_{1-x})O_2$ (0.5≤x<1), $Li_aNi_bCo_cX_dO_2$ (X is one or more selected from the group consisting of Mn, Al, Mg, Ti, Zr, Fe, V, W, Si, and Sn, and 0.9≤a≤1.10, 0.6≤b≤1.0, 0.0≤c≤0.2, and 0.0≤d≤0.2), and $Li_{1+x}Mn_{2-y-z-w}Al_yCo_zMg_wO_4$ (0.03<x<0.25, 0.01<y<0.2, 0.01<z<0.2, 0≤w<0.1, and x+y+z+w<0.4).

In general, the cathode active material of the Ni rich system has good reactivity, and thus is relatively unstable. When the nickel-based cathode active material is exposed to the atmosphere, carbon dioxide or water vapor is reacted with the surface of the cathode active material to easily form lithium-containing impurities such as lithium carbonate, and the content of the impurities is relatively increased compared to other active materials. Accordingly, the impurities such as lithium carbonate may be more efficiently reduced by using the cathode active material according to the present disclosure into which the partially reduced titanium dioxide, which is a surface modifier, is introduced as an active material of the Ni rich system.

In the present disclosure, in the active material of the Ni rich system, the content of nickel (Ni) in the total transition metals may be 50% or more, preferably 60% or more.

According to an exemplary embodiment of the present disclosure, the lithium transition metal oxide may be represented by the following Chemical Formula 2.

$Li_aNi_bCo_cX_dO_2$     [Chemical Formula 2]

In Chemical Formula 2, X is one or more selected from the group consisting of Mn, Al, Mg, Ti, Zr, Fe, V, W, Si, and Sn, and 0.9≤a≤1.10, 0.6≤b≤1.0, 0.0≤c≤0.2, and 0.0≤d≤0.2.

The average particle diameter of the cathode active material is not particularly limited as long as the particle diameter is in a typical range which may be used as an active material. The average particle diameter may be, for example, in a range of 5 to 30 μm, preferably in a range of 5 to 20 μm.

<Method for Preparing Cathode Active Material>

Hereinafter, a method for preparing a cathode active material according to the present disclosure will be described. However, the method is not limited to the following preparation method, and if necessary, a step of each process may be modified or optionally mixed and performed.

According to an exemplary embodiment of the preparation method, the method may include: (i) coating a surface of a lithium transition metal oxide-based particle with titanium dioxide ('step S10'); and (ii) subjecting the coated lithium metal composite oxide-based particles to heat treatment under an atmospheric condition of 550° C. or less for 0.5 to 5 hours ('step S20').

Hereinafter, each process step of the preparation method will be described as follows.

(1) Coating Step of Titanium Dioxide (Hereinafter, Referred to as 'Step S10')

In step S10, titanium dioxide particles are mixed with lithium transition metal oxide particles and coated on the surface of lithium transition metal oxide particles.

According to an exemplary embodiment thereof, lithium transition oxide particles and titanium dioxide particles may be coated through a typical dry mixing method known in the art. Alternatively, a coating solution is prepared by mixing titanium dioxide with a solvent and dispersing the resulting mixture, and then a lithium transition metal oxide is introduced into the coating solution to uniformly stir the resulting solution, thereby performing the coating.

In step S10, typical components known in the art may be used as titanium dioxide without limitation, and preferably, titanium dioxide particles having an average diameter of several nanometers to several hundred nanometers are used.

In the present disclosure, the amount of titanium dioxide used is not particularly limited, and may be, for example, in a range of 0.05 to 2.0 parts by weight based on 100 parts by weight of the lithium metal composite oxide-based particles, preferably in a range of 0.08 to 1.33 parts by weight.

In this case, as the solvent, a typical solvent known in the art may be used, and a volatile solvent is preferred. Non-limiting examples thereof include water or an organic solvent such as an alcohol having 1 to 6 carbon atoms and acetone, and the like.

In step S10, the coating method may use a typical dry or wet process typically known in the art, or a mixed process in which the dry process and the wet process are combined, without limitation, and general mixing may be performed or a dry mechanical milling method or a wet coating method may be used for achieving uniform mixing.

Non-limiting examples of an available coating method include a solvent evaporation method, a co-precipitation method, a precipitation method, a sol-gel method, a filtering method after adsorption, sputtering, chemical vapor deposition (CVD), convective coating (Convective), rotary coating (Tumbler), and the like. In this case, the coating conditions are not particularly limited, and may be appropriately adjusted according to the content of titanium dioxide particles and the component and content of the lithium transition metal oxide.

(2) Heat Treating Step (Hereinafter, Referred to as 'Step S20')

In step S20, by mixing lithium transition metal oxide particles with titanium dioxide having a nano size, and then performing heat treatment, the lithium transition metal composite oxide and the titanium dioxide particles in the coating layer are firmly bound to each other, and simultaneously, an oxidation-reduction reaction between the titanium dioxide and the cathode active material is induced to form a partially reduced titanium dioxide.

Meanwhile, when a compound (—C—) including carbon is present alone, the compound is decomposed autonomously only when a heat treatment temperature reaches a high temperature of 600° C. or more. In contrast, when the carbon compound (—C—) and titanium dioxide are mixed, titanium dioxide may induce a thermal activation reaction, so that the carbon compound may be sufficiently decomposed even at a relatively low temperature, for example, a temperature of 300° C. or more.

In this case, since titanium dioxide is not partially reduced at a high heat treatment temperature of 600° C. or more, the heat treatment in step S20 is performed preferably under an atmospheric condition of 550° C. or less for 0.5 to 5 hours, and more preferably in a range of 1 to 3 hours at 350 to 500° C.

The cathode active material prepared in the present disclosure is usually used as a cathode material for a secondary battery, and may be used in, for example, various fields to which the above-described configuration may be applied.

<Cathode>

The present disclosure provides the above-described cathode material for a secondary battery, and a lithium secondary battery including the same.

In this case, the cathode material of the present disclosure is required to include a cathode active material in which the above-described partially reduced titanium dioxide coating layer is at least formed. As an example, the cathode active material itself is used as a cathode active material, or a cathode composite material in which the cathode active material and a binding agent are mixed, a cathode composite material paste obtained by additionally adding a solvent to the cathode composite material, a cathode formed by additionally applying the cathode composite material paste on a current collector, and the like belong to the scope of the cathode material of the present disclosure.

The cathode may be prepared by a typical method known in the art, and may be prepared, for example, by mixing and stirring a binder, a conductive agent, and a dispersing agent, if necessary, with an electrode active material to prepare a slurry, applying (coating) the slurry on a current collector, compressing the current collector, and then drying the current collector.

In this case, as an electrode material such as a dispersion medium, a binder, a conductive agent, and a current collector, a typical electrode material known in the art may be used, and based on the amount of the electrode active material, the binder may be appropriately used in a range of 1 to 10 parts by weight, and the conductive agent may be appropriately used in a range of 1 to 30 parts by weight.

Examples of an available conductive agent include natural graphite, artificial graphite, carbon black, acetylene black series or Gulf Oil Company, Ketjen black, Vulcan XC-22, Super P, cokes, carbon nanotubes, graphenes, or one or more mixtures thereof, and the like.

Representative examples of the binding agent include polytetrafluoroethylene (PTFE), polyvinylidene fluoride (PVdF) or a copolymer thereof, styrene butadiene rubber (SBR), cellulose, and the like, and representative examples of the dispersing agent include isopropyl alcohol, N-methylpyrrolidone (NMP), acetone, and the like.

The current collector of the metal material is a metal having high conductivity, and as a metal to which the paste of the material may be easily adhered, any metal having no reactivity in the voltage range of the battery may be used. Examples thereof include mesh or foil formed of metal such as aluminum, copper or stainless steel, and the like.

<Lithium Secondary Battery>

The present disclosure provides a secondary battery including the cathode, preferably a lithium secondary battery.

The lithium secondary battery of the present disclosure is not particularly limited, except that the cathode active material in which the above-described partially reduced titanium dioxide coating layer is formed is used, and may be prepared by a typical method known in the art. For example, the secondary battery of the present disclosure may be prepared by inserting a separator between a cathode and an anode, and introducing a non-aqueous electrolyte.

In this case, the lithium secondary battery of the present disclosure includes an anode, a cathode, a separator, and an electrolyte as battery constituent elements, and the constituent elements of the anode, the separator, the electrolyte, and other additives, if necessary, except for the cathode, correspond to the elements of a typical lithium secondary battery known in the art.

As an example, a typical anode active material for a lithium secondary battery, which is known in the art, may be used for the anode, and as a non-limiting example thereof, a material capable of intercalating/deintercalating lithium is used, and examples thereof include lithium metal or a lithium alloy, cokes, artificial graphite, natural graphite, an organic polymer compound combustion body, carbon fiber, silicon-based materials, tin-based materials, and the like. Further, the conductive agent, the binding agent, and the solvent are used in the same manner as in the case of the above-described cathode.

The non-aqueous electrolyte includes electrolyte components typically known in the art, for example, electrolyte salts and electrolyte solvents.

The electrolyte salt may be composed of a combination of (i) a cationic ion selected from the group consisting of $Li^+$, $Na^+$, and $K^+$ and (ii) an anionic ion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, and $C(CF_2SO_2)_3^-$, and among them, a lithium salt is preferred. Specific examples of the lithium salt include $LiClO_4$, $LiCF_3SO_3$, $LiPF_6$, $LiBF_4$, $LiAsF_6$, $LiN(CF_3SO_2)_2$, and the like. These electrolyte salts may be used alone or in mixture of two or more thereof.

As the electrolyte solvent, a cyclic carbonate, a linear carbonate, lactone, ether, ester, acetonitrile, lactam, and ketone may be used.

Examples of the cyclic carbonate include ethylene carbonate (EC), propylene carbonate (PC), butylene carbonate (BC), fluoroethylene carbonate (FEC), and the like, and examples of the linear carbonate include diethyl carbonate (DEC), dimethyl carbonate (DMC), dipropyl carbonate (DPC), ethyl methyl carbonate (EMC), methyl propyl carbonate (MPC), and the like. Examples of the lactone include gamma butyrolactone (GBL), and examples of the ether include dibutyl ether, tetrahydrofuran, 2-methyl tetrahydrofuran, 1,4-dioxane, 1,2-dimethoxyethane, 1,2-diethoxyethane, and the like. Examples of the ester include methyl formate, ethyl formate, propyl formate, methyl acetate, ethyl acetate, propyl acetate, methyl propionate, ethyl propionate, butyl propionate, methyl pivalate, and the like. Further, examples of the lactam include N-methyl-2-pyrrolidone (NMP), and the like, and examples of the ketone include polymethyl vinyl ketone. In addition, halogen derivatives of the organic solvent may also be used, but the example is not limited thereto. Furthermore, as the organic solvent, glyme, diglyme, triglyme, and tetraglyme may also be used. These organic solvents may be used alone or in mixture of two or more thereof.

The separator may use a porous material, which serves to block an internal short-circuit of both electrodes and impregnate the electrolytic solution, without limitation. Non-limiting examples thereof include polypropylene-based, polyethylene-based, and polyolefin-based porous separators, or a composite porous separator in which an inorganic material is added to the porous separator, and the like.

Hereinafter, the present disclosure will be described in detail through the Examples, but the following Examples and Experimental Examples only exemplify one form of the present disclosure, and the scope of the present disclosure is not limited by the following Examples and Experimental Examples.

EXAMPLE 1

1-1. Preparation of Cathode Active Material

A cathode active material of Example 1 was prepared by quantifying 0.67 wt % of titanium dioxide to 99.33 wt % of a lithium transition metal composite oxide ($LiNi_{0.6}CO_{0.2}Mn_{0.2}O_2$), mixing the resulting mixture through a physical mode dry mixer, and then calcinating the mixture under an air atmosphere of 450° C. for 3 hours.

1-2. Preparation of Cathode

A slurry was prepared by dispersing 95 parts by weight of the cathode active material prepared in Example 1-1, 2.5 parts by weight of a PvdF binder, and 2.5 parts by weight of carbon black as a conductive agent in an NMP solution, and then applied on an Al current collector. Thereafter, a cathode was prepared by rolling with a roll press.

1-3. Preparation of Lithium Secondary Battery

A coin cell was prepared by employing the cathode prepared in Example 1-2 and lithium metal as counter electrodes, and using an electrolyte solution composed of EC/EMC/DEC (20/70/10, volume ratio) and 1 M $LiPF_6$.

EXAMPLES 2 to 7

Each of the cathode active materials and the lithium secondary batteries in Examples 2 to 7 was prepared by performing the same method as in Example 1, except that the conditions were changed as in the following Table 1.

TABLE 1

| | Lithium transition metal oxide | Content (wt %) of titanium dioxide | Heat treatment temperature (° C.) |
|---|---|---|---|
| Example 1 | $LiNi_{0.6}Co_{0.2}Mn_{0.2}O_2$ | 0.67 | 450 |
| Example 2 | $LiNi_{0.6}Co_{0.2}Mn_{0.2}O_2$ | 1.00 | 450 |
| Example 3 | $LiNi_{0.6}Co_{0.2}Mn_{0.2}O_2$ | 1.33 | 450 |
| Example 4 | $LiNi_{0.8}Co_{0.1}Mn_{0.1}O_2$ | 0.67 | 450 |
| Example 5 | $LiNi_{0.6}Co_{0.2}Mn_{0.2}O_2$ | 0.08 | 450 |
| Example 6 | $LiNi_{0.6}Co_{0.2}Mn_{0.2}O_2$ | 0.33 | 450 |
| Example 7 | $LiNi_{0.6}Co_{0.2}Mn_{0.2}O_2$ | 1.00 | 500 |
| Comparative Example 1 | $LiNi_{0.6}Co_{0.2}Mn_{0.2}O_2$ | — | — |
| Comparative Example 2 | $LiNi_{0.6}Co_{0.2}Mn_{0.2}O_2$ | 1.00 | 700 |
| Comparative Example 3 | $LiNi_{0.8}Co_{0.1}Mn_{0.1}O_2$ | — | — |

COMPARATIVE EXAMPLES 1 to 3

Each of the cathode active materials and the lithium secondary batteries in Comparative Examples 1 to 3 was prepared by performing the same method as in Example 1, except that the conditions were changed as in the above Table 1.

EXPERIMENTAL EXAMPLE 1

Surface Shape of Cathode Active Material

The surfaces of the cathode active materials prepared in Example 1 and Comparative Example 1 were observed by a scanning electron microscope (SEM).

FIG. 1 is a surface shape of the cathode active material in Comparative Example 1, which is composed only of a cathode active material.

Figure 2:
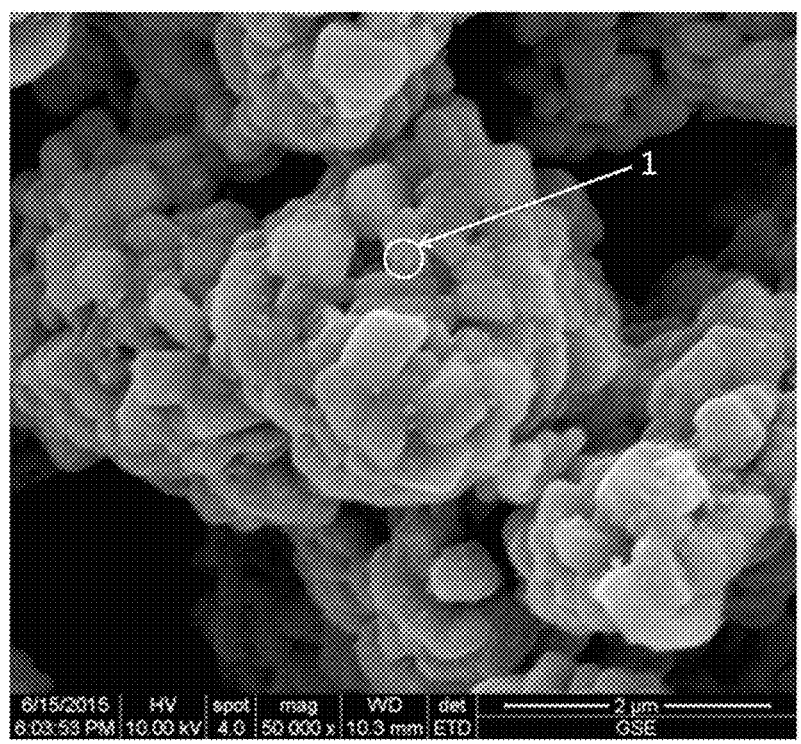
FIG. 2 is an SEM photograph of the surfaces of cathode active material prepared in Example 1.

Meanwhile, FIG. 2 is a surface shape of the cathode active material in Example 1, and it can be confirmed that titanium dioxide particles (1) having a nano size are uniformly distributed on the surface of the cathode active material.

EXPERIMENTAL EXAMPLE 2

Evaluation of Surface Chemical Structure (XPS)

With respect to the cathode active materials prepared in Example 7 and Comparative Example 2, the state of titanium included in the titanium dioxide coating layer was evaluated by an X-ray photoelectron spectrometry (XPS). In this case, a typical titanium dioxide ($TiO_2$) was used as a control group, and the XPS analysis results thereof are illustrated in the following FIGS. 3 to 5.

Figure 3:
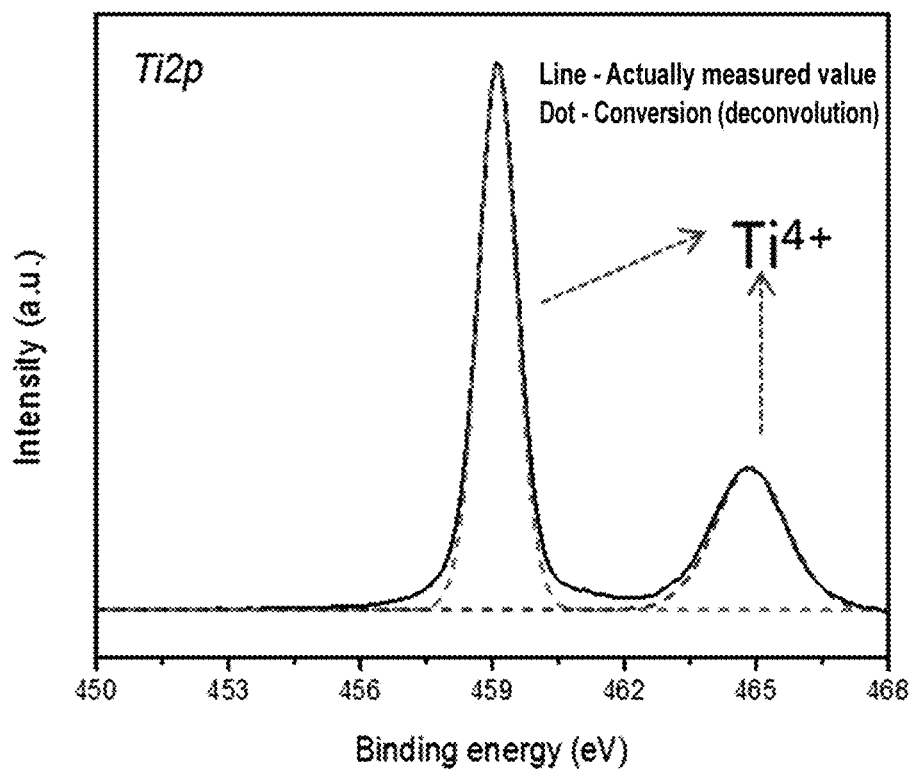
FIG. 3 is an X-ray photoelectron spectrometry (XPS) graph of titanium dioxide in the related art.
Figure 4:
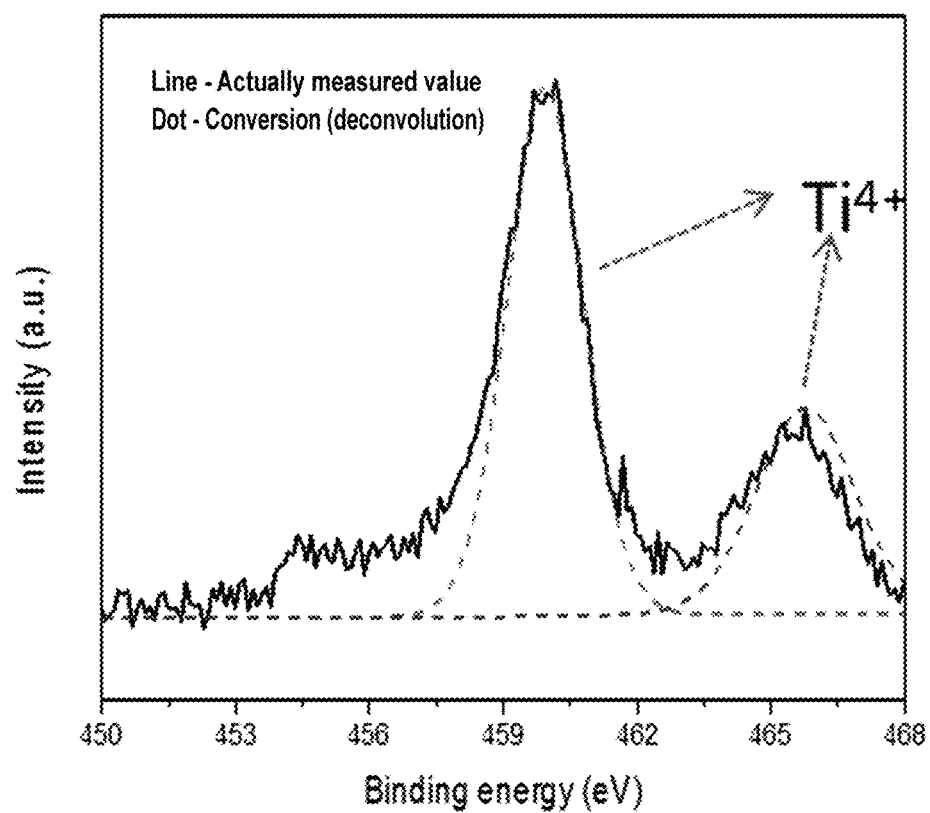
FIG. 4 is an XPS graph of a cathode active material prepared in Comparative Example 2.
Figure 5:
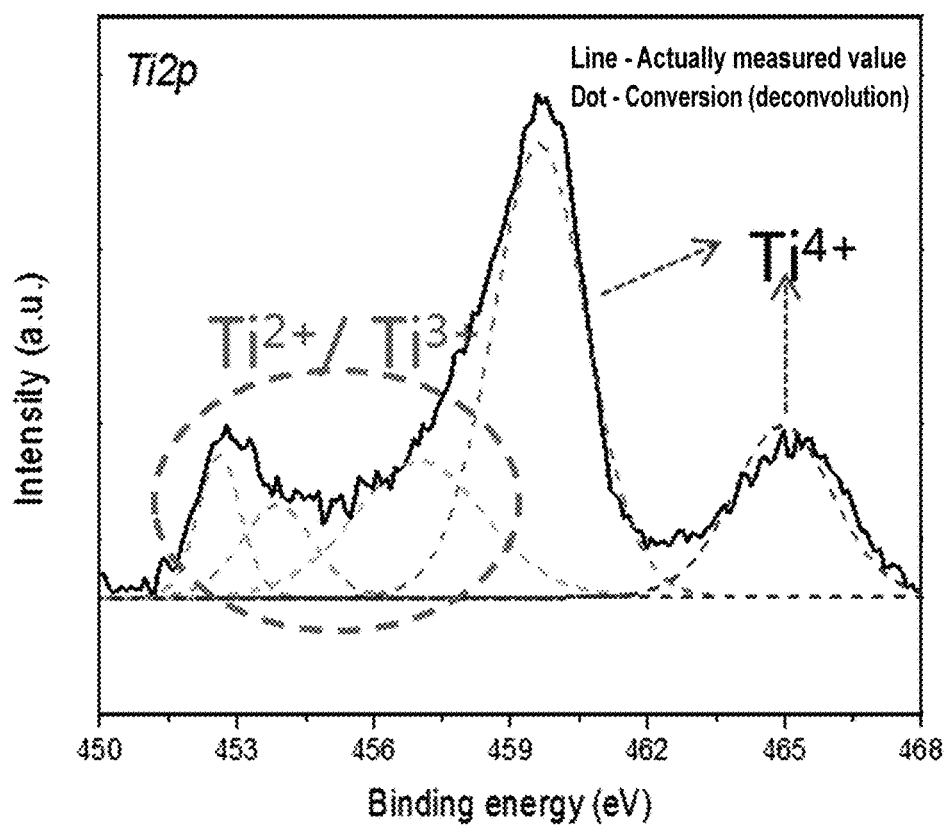
FIG. 5 is an XPS graph of a cathode active material prepared in Example 7.

As a result of the experiment, it could be seen that in the cathode active material of Comparative Example 2, which was fired at 700° C. after being coated with titanium dioxide, the Ti2p spectra by the XPS were shown nearly identical to those in a typical titanium dioxide ($TiO_2$) (see FIGS. 3 and 4).

In contrast, it could be seen that in the cathode active material prepared in Example 7, peaks of 452 to 457 eV were separately present in addition to the peaks of 457 to 460 eV derived from $Ti^{4+}$. This is determined to show that $Ti^{2+}$ and/or $Ti^{3+}$ resulting from the partial reduction of titanium dioxide are/is present (see FIG. 5).

EXPERIMENTAL EXAMPLE 3

Evaluation of Electrical Conductivity

With respect to the cathode active materials prepared in Example 7 and Comparative Example 2, an evaluation of electrical conductivity was conducted as follows.

The powder resistivity values of the cathode active materials were each measured while compressing the cathode active materials by changing the densities as in the following Table 2 in accordance with the Experimental Standard ASTM D257, and the experimental results thereof are each shown in Table 2 and FIG. 6.

TABLE 2

| | Volume resistivity (Ohm-cm) | | Resistivity |
|---|---|---|---|
| Pressure (MPa) | Comparative Example 2 ($R_{TiO2}$) | Example 7 ($R_{TiO2-x}$) | Ratio ($R_{TiO2-x}/R_{TiO2}$) |
| 13 | 11918 | 5674 | 0.48 |
| 25 | 6160 | 2405 | 0.39 |
| 38 | 4349 | 1563 | 0.36 |

TABLE 2-continued

| | Volume resistivity (Ohm-cm) | | Resistivity |
|---|---|---|---|
| Pressure (MPa) | Comparative Example 2 ($R_{TiO2}$) | Example 7 ($R_{TiO2-x}$) | Ratio ($R_{TiO2-x}/R_{TiO2}$) |
| 51 | 3414 | 1169 | 0.34 |
| 64 | 2817 | 947 | 0.34 |

Figure 6:
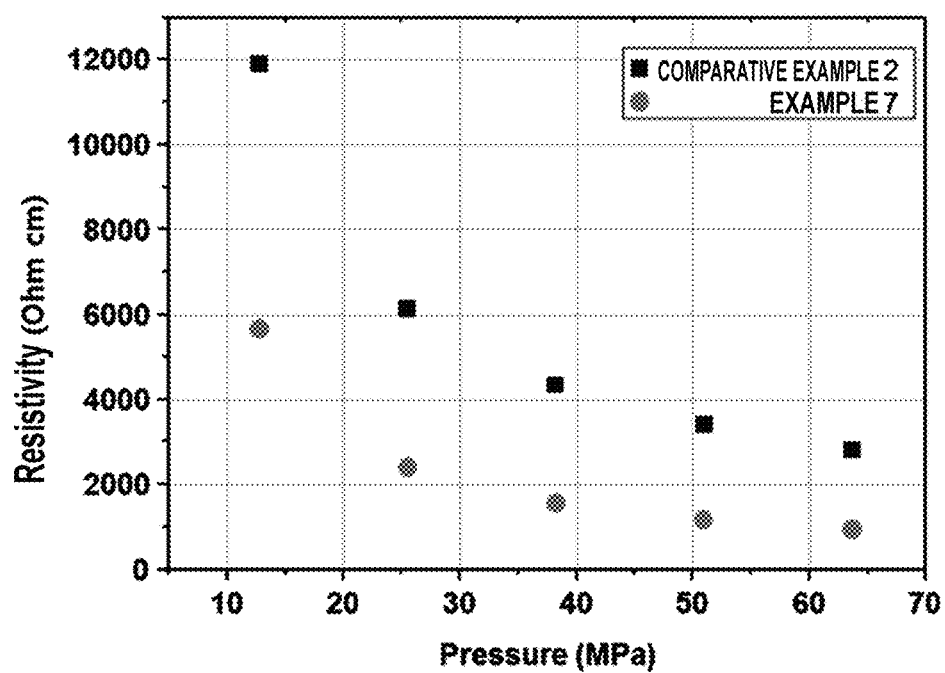
FIG. 6 is a graph showing a change in resistivity according to the pressure applied by using the cathode active materials prepared in Example 7 and Comparative Example 2.

As shown in Table 2 and FIG. 6, it could be seen that the cathode active material in Comparative Example 2 exhibited resistance characteristics similar to those of insulators in the related art, whereas the powder resistivity values of the cathode active material in Example 7 were remarkably lower than those of the cathode active material in Comparative Example 2. This indicates that after the cathode active material was coated with titanium dioxide, titanium dioxide was partially reduced through heat treatment, thereby enhancing the electrical conductivity.

EXPERIMENTAL EXAMPLE 4

Evaluation of Contents of Remaining Lithium-Containing Impurities

The cathode active material powders prepared in Examples 1 and 4 to 6 and Comparative Examples 1 and 3 were dissolved in water and titrated with hydrochloric acid to calculate the contents of LiOH and $Li_2CO_3$ included in the cathode active material powders, the weight ratio $Li_2CO_3$/LiOH of LiOH and $Li_2CO_3$ remaining on the surface of the lithium transition metal oxide was calculated therefrom, and the results thereof are shown in the following Tables 3 and 4, respectively.

TABLE 3

| | Cathode ($LiNi_{0.6}Co_{0.2}Mn_{0.2}O_2$) | Remaining lithium (%) | | | |
|---|---|---|---|---|---|
| | | Lithium hydroxide (a) | Lithium carbonate (b) | (a) + (b) | (b)/(a) |
| Comparative Example 1 | No titanium dioxide included | 0.181 | 0.611 | 0.792 | 3.38 |
| Example 5 | 0.08 wt % of titanium dioxide | 0.209 | 0.523 | 0.732 | 2.50 |
| Example 6 | 0.33 wt % of titanium dioxide | 0.220 | 0.418 | 0.638 | 1.9 |
| Example 1 | 0.67 wt % of titanium dioxide | 0.237 | 0.298 | 0.535 | 1.26 |

TABLE 4

| | Cathode ($LiNi_{0.8}Co_{0.1}Mn_{0.1}O_2$) | Remaining lithium (%) | | | |
|---|---|---|---|---|---|
| | | Lithium hydroxide (a) | Lithium carbonate (b) | (a) + (b) | (b)/(a) |
| Comparative Example 3 | No titanium dioxide included | 0.161 | 0.866 | 1.027 | 5.38 |
| Example 4 | 0.67 wt % of titanium dioxide | 0.201 | 0.481 | 0.682 | 2.38 |

As could be seen in Tables 3 and 4, it could be seen that in Examples 1 and 4 to 6, the contents of the Li-containing impurities remaining on the surface of the cathode active material were significantly reduced compared to those in Comparative Examples 1 and 3, and that particularly the contents of lithium carbonate were remarkably reduced.

It could also be seen that the above-described reduction phenomenon of the remaining impurities was better exhibited in the cathode active material in which a high content of nickel was included.

EXPERIMENTAL EXAMPLE 5

Evaluation of Electrochemical Properties of Secondary Battery—Evaluation of Coulomb Efficiency, Capacity, and Cycle Life Characteristics The electrochemical properties were evaluated by using the lithium secondary batteries each prepared in Examples 1 to 3 and Comparative Examples 1 and 2.

The 0.2 C capacity indicates a discharge capacity at the first charge and discharge by performing the charge and discharge test twice in a voltage region of 4.3 V to 3.0 V based on the 0.2 C, and the coulomb efficiency was calculated through the ratio of the discharge capacity to the charge capacity in this process. For the cycle life at normal temperature, the maintaining ratio compared to the initial capacity was measured by performing the charge and discharge test 150 times in a voltage region of 4.4 V to 3.0 V based on 1 C at 25° C.

TABLE 5

| | Titanium dioxide (wt %) | Heat treatment (° C.) | 0.2 C capacity (mAh/g) | Coulomb efficiency (%) | Cycle life at normal temperature (%) |
|---|---|---|---|---|---|
| Comparative Example 1 | — | — | 179.3 | 92.1 | 84 |
| Comparative Example 2 | 1.00 | 700° C. | 172.3 | 90.1 | 66 |
| Example 1 | 0.67 | 450° C. | 184.8 | 94.3 | 90 |
| Example 2 | 1.00 | 450° C. | 183.9 | 94.3 | 91 |
| Example 3 | 1.33 | 450° C. | 182.8 | 92.5 | 89 |

As can be seen in Table 5, it could be seen that the batteries in Examples 1 to 3, which include the cathode active material of which the surface was modified with partially reduced titanium dioxide, were remarkably excellent in terms of capacity, coulomb efficiency, and cycle life characteristics compared to those in Comparative Examples 1 and 2.

In particular, it could be confirmed that in the case of Comparative Example 2 where heat treatment was performed at a high temperature of 700° C. even though the surface was modified with titanium dioxide, the properties of the battery deteriorated compared to Comparative Example 1. This is determined that titanium dioxide was not partially reduced by a high temperature.

EXPERIMENTAL EXAMPLE 6

Evaluation of High Potential Characteristics

The high voltage stability evaluation of the battery was performed by using the lithium secondary batteries each prepared in Example 1 and Comparative Example 1.

In this case, with respect to the high voltage stability evaluation, a charge and discharge test was performed in a voltage region of 2.5 to 4.7 V based on 0.2 C.

Figure 7:
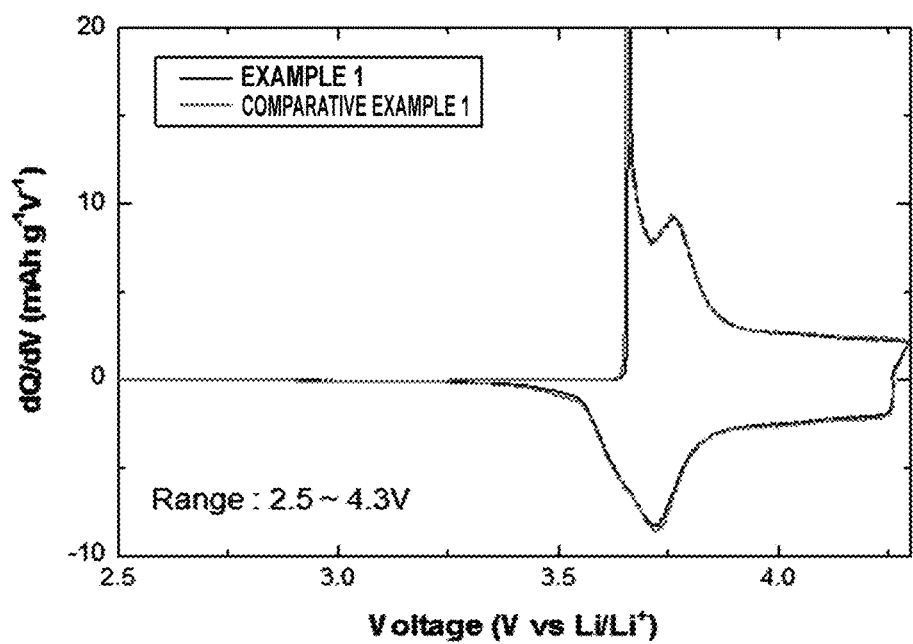
FIG. 7 is a graph showing charge and discharge characteristics of the batteries in Example 1 and Comparative Example 1 under normal voltage conditions.
Figure 8:
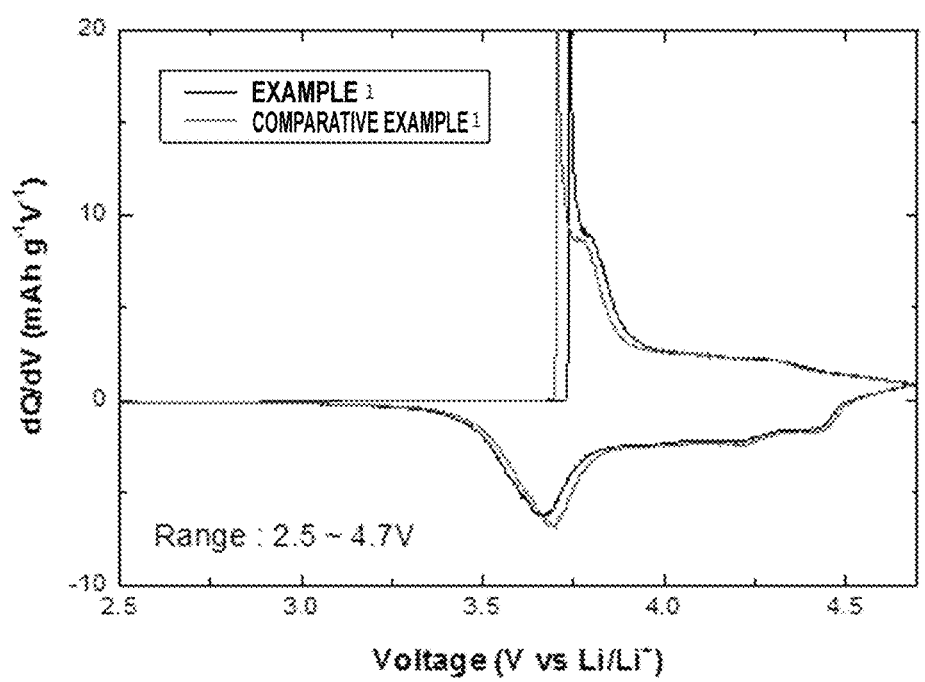
FIG. 8 is a graph showing charge and discharge characteristics of the batteries in Example 1 and Comparative Example 1 under high voltage conditions.

As a result of the experiment, the battery in Comparative Example 1 exhibited a charge and discharge aspect similar to that in Example 1 in a normal voltage operating region, but the surface of the cathode active material became unstable in a high voltage range, showing that the graph was shifted (see FIGS. 7 and 8).

In contrast, it could be seen that the battery in Example 1 had stable charge and discharge characteristics both in a normal voltage operating range and a high voltage range (see FIGS. 7 and 8).

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A cathode active material comprising:
   lithium transition metal oxide-based particles; and
   a titanium dioxide coating layer formed on a part or a whole of a surface of the particle,
   wherein the titanium dioxide coating layer is a partially reduced $TiO_{2-x}$ ($0 < x < 2$); and
   wherein the cathode active material comprises Li-containing impurities remaining on the surface thereof and a weight ratio ($Li_2CO_3$/LiOH) of $Li_2CO_3$ and LiOH contained as the Li-containing impurities is in a range of 1.0 to 5.0.

2. The cathode active material of claim 1, wherein the titanium dioxide coating layer has a peak present in a range of 452 to 457 eV in the Ti2p spectra by an X-ray photoelectron spectrometry (XPS).

3. The cathode active material of claim 2, wherein the titanium dioxide coating layer has a ratio ($P_S/P_R$) of peak intensity ($P_S$) of 452 to 457 eV derived from partially reduced Ti to peak intensity ($P_R$) of 457 to 460 eV derived from $Ti^{4+}$ in a range of 0.01 to 0.5 in the Ti2p spectra by an X-ray photoelectron spectrometry (XPS).

4. The cathode active material of claim 1, wherein
   a content of the Li-containing impurities is 2.0 wt % or less based on a total weight of the cathode active material.

5. The cathode active material of claim 1, wherein an average particle size of the partially reduced titanium dioxide particles in the coating layer is in a range of 0.5 to 100 nm.

6. The cathode active material of claim 1, wherein a content of the titanium dioxide coating layer is in a range of 0.05 to 2.0 wt % based on a total wt % of the cathode active material.

7. The cathode active material of claim 1, wherein the lithium transition metal oxide-based particles are selected from the group consisting of $LiCoO_2$, $LiNiO_2$, $LiMn_2O_4$, $Li_4Mn_5O_{12}$, $LiNi_{1/3}Mn_{1/3}Co_{1/3}/O_2$, $LiFePO_4$, $Li(Co_xNi_{1-x})O_2$ ($0.5 \leq x < 1$), $Li_aNi_bCo_cX_dO_2$ (X is one or more selected from the group consisting of Mn, Al, Mg, Ti, Zr, Fe, V, W, Si, and Sn, and $0.9 < a < 1.10$, $0.6 \leq b \leq 1.0$, $0.0 \leq c \leq 0.2$, and $0.0 \leq d \leq 0.2$), and $Li_{1+x}Mn_{2-y-z-w}Al_yCo_zMg_wO_4$ ($0.03 < x < 0.25$, $0.01 < y < 0.2$, $0.01 < z < 0.2$, $0 \leq w < 0.1$, and $x+y+z+w < 0.4$).

8. The cathode active material of claim 1, wherein the lithium transition metal oxide-based particles have a nickel (Ni) content of 50% or more in the total transition metals.

9. The cathode active material of claim 1, wherein the cathode active material has a ratio ($R_{TiO2-x}/R_{TiO2}$) of powder resistivity ($R_{TiO2-x}$) of partially reduced titanium dioxide to powder resistivity ($R_{TiO2}$) of titanium dioxide of 0.5 or less under a compression condition of 13 to 64 MPa.

10. A cathode comprising the cathode active material of claim 1.

11. The cathode of claim 10, wherein the titanium dioxide coating layer has a peak present range of 452 to 457 eV in the Ti2p spectra by an X-ray photoelectron spectrometry (XPS).

12. The cathode of claim 10, wherein the titanium dioxide coating layer has a ratio ($P_S/P_R$) of peak intensity (PS) of 452 to 457 eV derived from partially reduced Ti to peak intensity ($P_R$) of 457 to 460 eV derived from $Ti^{4+}$ in a range of 0.01 to 0.5 in the Ti2p spectra by an X-ray photoelectron spectrometry (XPS).

13. The cathode of claim 10, wherein the cathode active material has a ratio ($R_{TiO2-x}/R_{TiO2}$) of powder resistivity ($R_{TiO2-x}$) of partially reduced titanium dioxide to powder resistivity ($R_{TiO2}$) of titanium dioxide of 0.5 or less under a compression condition of 13 to 64 MPa.

14. The cathode of claim 10,
    a content of the Li-containing impurities is 2.0 wt % or less based on a total weight of the cathode active material.

15. A lithium secondary battery comprising the cathode of claim 10, an anode, a separator interposed therebetween, and an electrolyte.

16. A method for preparing the cathode active material of claim 1, the method comprising:
    (i) coating a surface of a lithium transition metal oxide-based particle with titanium dioxide; and
    (ii) subsequently subjecting the coated lithium metal composite oxide-based particles to heat treatment under an atmospheric condition of 550° C. or less for 0.5 to 5 hours, so that the titanium dioxide is partially reduced by an oxidation-reduction reaction with the lithium transition metal oxide-based particle.

17. The method of claim 16, wherein in Step (i), an amount of titanium dioxide used is 0.05 to 2.0 wt % based on a total wt % of the lithium transition metal oxide-based particles.

* * * * *